US012124153B2

United States Patent
He et al.

(10) Patent No.: US 12,124,153 B2
(45) Date of Patent: Oct. 22, 2024

(54) TRIPOD FOR 3D MODELING AND METHOD FOR DETERMINING CAMERA CAPTURE PARAMETERS

(71) Applicant: Shanghai Yiwo Information Technology Co., LTD., Shanghai (CN)

(72) Inventors: Yunliang He, Shanghai (CN); Ming Zhao, Shanghai (CN); Pei Cai, Shanghai (CN)

(73) Assignee: Shanghai Yiwo Information Technology Co., LTD., Shanghai (CN)

( * ) Notice: Subject to any disclaimer, the term of this patent is extended or adjusted under 35 U.S.C. 154(b) by 233 days.

(21) Appl. No.: 17/542,053

(22) Filed: Dec. 3, 2021

(65) Prior Publication Data

US 2022/0091486 A1 Mar. 24, 2022

Related U.S. Application Data

(63) Continuation of application No. PCT/CN2020/093375, filed on May 29, 2020.

(30) Foreign Application Priority Data

Jun. 4, 2019 (CN) .......................... 201910480654.1

(51) Int. Cl.
*G03B 17/56* (2021.01)
*H04N 23/55* (2023.01)

(52) U.S. Cl.
CPC ........... *G03B 17/561* (2013.01); *H04N 23/55* (2023.01)

(58) Field of Classification Search
CPC ...... G03B 17/561; H04N 23/55; F16M 11/04; G06F 7/73
See application file for complete search history.

(56) References Cited

U.S. PATENT DOCUMENTS 5,421,549 A * 6/1995 Richards ................ F16M 11/10
396/419
11,079,060 B2 * 8/2021 Innes .................. G09F 15/0062
(Continued)

FOREIGN PATENT DOCUMENTS

CN 204164111 U 2/2015
CN 206592727 U * 10/2017
(Continued)

OTHER PUBLICATIONS

"Modelling and Automated Calibration of a general multi-projective camera" The Photogrammetric Record 33 (161): 86-112 (Mar. 2018) by Ehsan Khoramshani et al (Year: 2018).*
(Continued)

*Primary Examiner* — Terrell L McKinnon
*Assistant Examiner* — Ding Y Tan
(74) *Attorney, Agent, or Firm* — Seed IP Law Group LLP

(57) ABSTRACT

The present disclosure discloses a tripod for 3D modeling and a method for determining camera capture parameters, including the height and the direction of the camera lens. The tripod includes a telescopic rod, a mobile phone holder, a mounting support, and a floor stand. The telescopic rod is formed by multiple sections of nested hollow round rods, and the round rods can be extended and locked. The mobile phone holder is attached to the telescopic rod through a mobile phone holder install base. The mounting support is set on the top of the telescopic rod. The floor stand is set at the bottom of the telescopic rod. The telescopic rod is vertically set on a plane through the floor stand. There are three sets of the floor stand brackets that are evenly set around the telescopic rod. According to the present disclosure, contrasting colors are used at the bottom of the tripod where it touches the floor to help recognize these points. The height of the tripod can be accurately calculated by mea-
(Continued)

suring the distance between these points in the image captured by the camera. The mobile phone holder is attached to the tripod, and a direction sensor of the mobile phone is used to record the direction during capture, so that the direction of camera capture can be obtained even when the camera does not have a direction sensor. The tripod features a simple structure, easy operation, low costs, and a compact storage which is easy to carry.

18 Claims, 2 Drawing Sheets

(56) References Cited

U.S. PATENT DOCUMENTS

| | | | |
|---|---|---|---|
| 2013/0229529 A1 | 9/2013 | Lablans | |
| 2015/0271402 A1* | 9/2015 | Guo | H04N 23/631 |
| | | | 348/39 |
| 2015/0286116 A1* | 10/2015 | Johnson, Sr. | F16M 11/14 |
| | | | 348/373 |
| 2018/0352159 A1* | 12/2018 | Kim | H04N 23/54 |
| 2019/0236807 A1* | 8/2019 | Zhang | G06T 7/70 |
| 2019/0378294 A1* | 12/2019 | Zhang | G06T 7/70 |
| 2020/0134853 A1* | 4/2020 | Milici | G06T 7/80 |

FOREIGN PATENT DOCUMENTS

| | | | | |
|---|---|---|---|---|
| CN | 207218846 U | | 4/2018 | |
| CN | 207266151 U | | 4/2018 | |
| CN | 207777965 U | | 8/2018 | |
| CN | 208273113 U | * | 12/2018 | |
| CN | 109636859 A | * | 4/2019 | G06T 7/85 |
| CN | 110209001 A | | 9/2019 | |
| EP | 2240740 B1 | * | 10/2014 | G01C 1/04 |
| KR | 101022872 B1 | * | 3/2011 | |
| KR | 20180083007 A | * | 7/2018 | |
| WO | WO-2016196825 A1 | * | 12/2016 | G02B 13/06 |
| WO | WO-2017098090 A1 | * | 6/2017 | F16M 11/045 |

OTHER PUBLICATIONS

"Distance measurement in panorama" by Zhongding Jiang et al., IEEE paper 2007, https://ieeexplore.ieee.org/stamp/stamp.jsp?arnumber=4379604 (Year: 2007).*

ECE 661 Computer Vision (2018 Fall) Homework 8 Runzhe Zhang dated Nov. 8, 2018, /https://engineering.purdue.edu/kak/computervision/ECE661_Fall2018/Homeworks/HW8/2BestSolutions/1.pdf (Year: 2018).*

Emerging Topics in Computer Vision dated 2004 ichapter 2 camera calibration by Zhengyou Zhang https://people.cs.rutgers.edu/~elgammal/classes/cs534/lectures/CameraCalibration-book-chapter.pdf (Year: 2004).*

Scantips.com "calculate distance or size of an object in a photo image" online tutorial dated by archive.org Feb. 19, 2019, https://www.scantips.com/lights/subjectdistance.html (Year: 2019).*

* cited by examiner

TRIPOD FOR 3D MODELING AND METHOD FOR DETERMINING CAMERA CAPTURE PARAMETERS

TECHNICAL FIELD

The present disclosure relates to a support platform and a method for using the support platform, and in particular, to a tripod for 3D modeling and a method for determining camera capture parameters.

BACKGROUND 3D modeling based on image capture by camera requires accurate height and direction of the camera lens. The tripods currently available on the market are designed as a simple support for the camera, while most cameras by themselves cannot record the direction of capture. Secondly, by allowing height adjustments, tripods available on the market cannot maintain a consistent height of the camera lens. Moreover, the fact that it is hard to reliably recognize points in the image where the tripod touches the floor, makes it difficult to measure camera height. Further, to correct camera tilt usually requires an adjustment mechanism, which means complex structures and cumbersome operations. It is obvious that there is a need for a tripod that helps measure the camera height and record the direction of capture.

SUMMARY

The present disclosure provides a tripod for 3D modeling and a method for determining camera capture parameters, including the height and the direction of the camera lens (also referred below as the height and the direction of the camera), which are difficult to obtain with existing techniques.

The technical solution used in the present disclosure provides a tripod for 3D modeling, including a telescopic rod, a mobile phone holder, a mounting support, and a floor stand. The telescopic rod consists of multiple sections of nested hollow round rods, which can be extended and locked. The mobile phone holder is attached to one section of the telescopic rod through a mobile phone holder install base. The mounting support is set on the top of the telescopic rod. The floor stand is set at the bottom of the telescopic rod. The telescopic rod is vertically set on a plane through the floor stand, which consists of three sets of floor stand brackets including connecting rods and support rods that are evenly set around the telescopic rod.

Further, the bottom end of an inner nested rod is provided with a locking pin, and the top end of an outer nested rod is provided with a locking hole.

Further, the mounting support includes an install cylinder, a round base, and an install screw. The round base is attached to the top of the telescopic rod with the install cylinder, and the install screw is set at the center of the round base. A panoramic camera is attached to the mounting support using the install screw.

Further, the mounting support is provided with a quick release plate base, the quick release plate base is installed with the install screw, the quick release plate base is provided with a quick release plate for mounting a camera, and the quick release plate is a movable card plate. The movable card plate's width can be adjusted and locked through a locking knob.

Further, the mobile phone holder install base is fastened to the telescopic rod, and the mobile phone holder's width can be adjusted.

Further, the floor stand consists of three sets of connecting rods and support rods. One end of the support rod is pin-connected to the middle of the connecting rod, the other end of the support rod is attached to the bottom of the telescopic rod through a fixed ring. One end of the connecting rod is pin-connected to a sliding ring on the telescopic rod. A foot cover is present at the other end of the connecting rod.

Further, the sliding ring is attached to the telescopic rod, with a bushing at the inner side. The sliding ring moves on the telescopic rod and can be locked through a locking screw attached to the sliding ring.

Further, the color of the foot cover and the color of the connecting rod are contrasting colors.

The present disclosure further provides a method for determining camera height with the camera mounted on the above tripod for 3D modeling. The method includes the following steps: (S1) obtaining a downward looking view from the camera from a panoramic image captured by the camera; (S2) locating areas of two foot covers in the view, to calculate the position of the center point of each foot cover; (S3) calculating an Euclidean distance between the two foot covers; (S4) obtaining an actual measured value of the camera height first, and repeating steps S1 to S4 to obtain multiple sets of data of the Euclidean distance between foot covers relating to the camera height; (S5) performing spline interpolation based on the data obtained in S4, to fit a mapping relationship between the camera height and the Euclidean distance between foot covers; and (S6) for a newly captured image, recognizing and calculating a Euclidean distance between two foot covers in a view from the image, then calculating the height of camera lens using the spline function in S5.

Further, using the mobile phone holder install base fastened to the telescopic rod, where the mobile phone holder's width can be adjusted, the method further includes the following steps to determine the camera direction: (S7) separately attaching the mobile phone and the panoramic camera on the tripod, and ensuring that the angle between the two remains unchanged; (S8) identifying the position of the rear-facing camera of the mobile phone (also referred below as the direction of the mobile phone) in a panoramic image captured by the camera, in order to calculate an angle theta between the directions of the mobile phone and the panoramic camera; (S9) when capturing another image by the camera, with the help of a sensor of the mobile phone, obtaining an angle phi of the mobile phone's rotation from its position from the previous camera capture. Given that the angle between the mobile phone and the camera remains unchanged across the two captures, the angle between the directions of the two camera captures must also be phi. As a result, a relative angle of rotation between subsequent panoramic image captures can be obtained; and (S10) obtaining an angle alpha between the direction of the mobile phone and the true north, with the help of a compass sensor of the mobile phone. Together with the angle theta between the directions of the mobile phone and the camera, the angle between the camera lens and the true north can be calculated.

Compared with the existing technologies, the present disclosure brings the following beneficial effects: According to the tripod for 3D modeling and method for determining camera capture parameters provided in the present disclosure, contrasting colors are used where the tripod touches the floor to help recognize these points, and subsequently the height of the camera lens can be calculated by measuring the distance between these points in the image. With the mobile phone holder attached to the tripod, and a direction sensor of the mobile phone is used to record the direction during capture, so that the direction of camera capture can be obtained even when the camera does not have a direction sensor. The tripod features a simple structure, easy operation, low costs, and compact storage which is easy to carry.

DESCRIPTION OF EMBODIMENTS

The present disclosure is further described with reference to accompanying drawings and embodiments.

Figure 1:
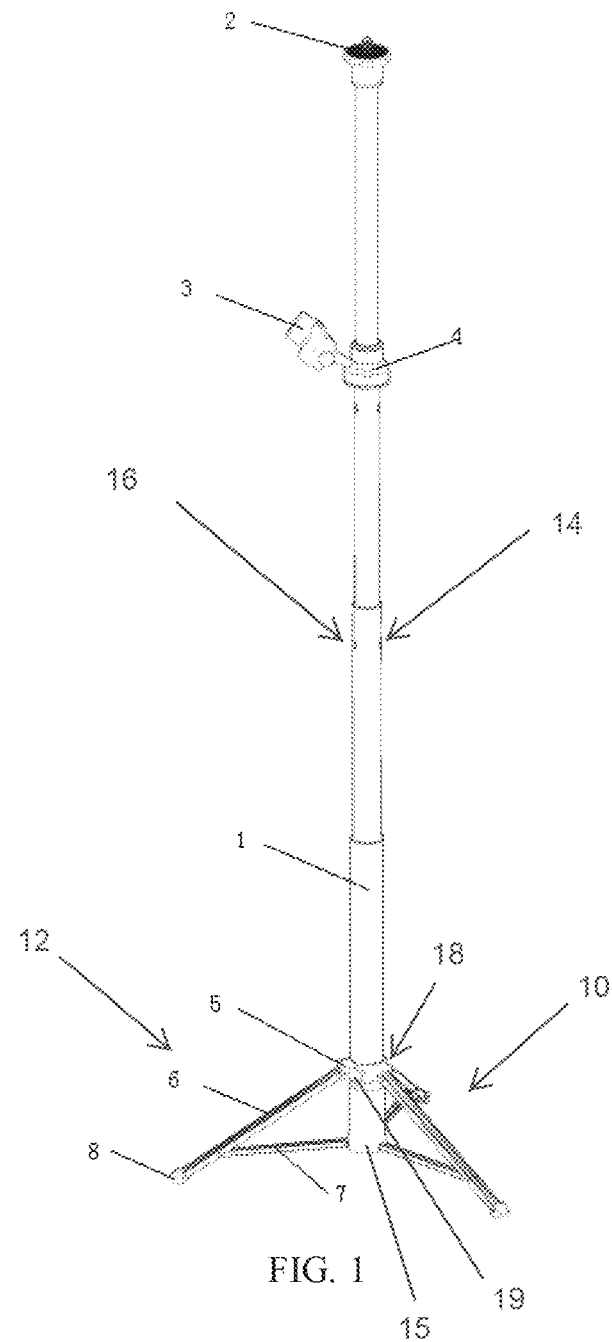
FIG. 1 is a schematic structural diagram illustrating a tripod for 3D modeling according to an embodiment of the present disclosure.

FIG. 1 is a schematic structural diagram illustrating a tripod for 3D modeling according to an embodiment of the present disclosure.

Referring to FIG. 1, the tripod for 3D modeling according to the embodiment of the present disclosure includes a telescopic rod 1, a mobile phone holder 3, a mounting support 2, and a floor stand 10. The telescopic rod 1 is formed by multiple sections of nested hollow round rods, and the round rods can be extended and locked. The mobile phone holder 3 is attached to the telescopic rod 1 through a mobile phone holder install base 4, the mounting support 2 is set on the top of the telescopic rod 1, and the floor stand 10 is set at the bottom of the telescopic rod 1. The telescopic rod 1 is vertically set on a surface through the floor stand 10, and the floor stand 10 includes three sets of floor stand brackets 12 that are evenly set around the telescopic rod 1.

For example, in the tripod for 3D modeling according to the embodiment of the present disclosure, the bottom end of an inner nested round rod of the telescopic rod 1 is provided with a locking pin 14, and the top end of an outer nested round rod is provided with a locking hole 16. The telescopic rod 1 can be extended and can be locked by rotation or other means. When the round rod is fully extended, and is locked with the locking hole and the locking pin, and the height of the telescopic rod 1 is known and constant. When the round rod is fully shrinked, it is compact and is easy to store and carry.

For example, in the tripod for 3D modeling according to the embodiment of the present disclosure, the mobile phone holder install base 4 is fastened to the telescopic rod 1, and the mobile phone holder 3 can be adjusted in width, for example, is provided with an adjusting knob or a spring, to help record the direction. During capture, the mobile phone is placed on the mobile phone holder 3 and a direction sensor of the mobile phone is used to record the direction, so that the accurate capture direction can be obtained even when the camera does not have a direction sensor.

For example, in the tripod for 3D modeling according to the embodiment of the present disclosure, each set of floor stand bracket 12 of the floor stand 10 includes a connecting rod 6 and a support rod 7, one end of the support rod 7 is pin-connected to, e.g., the middle of, the connecting rod 6, the other end of the support rod 7 is attached to the bottom of the telescopic rod 1 through a fixed ring 15, and the support rod 7 is pin-connected to the fixed ring; one end of the connecting rod 6 is pin-connected to the sliding ring 5, and the other end of the connecting rod 6 is provided with a foot cover 8. The sliding ring 5 is attached to the telescopic rod 1, an inner side of the sliding ring 5 is provided with a bushing 18, the sliding ring 5 is provided with a locking screw 19, and the sliding ring 5 moves on the telescopic rod and is locked through the locking screw 19. The sliding ring 5 drives the connecting rod 6 and the support rod 7 to move, and the three sets of floor stand brackets 12 move synchronously so that the telescopic rod 1 changes in height only, and the camera set on the mounting support can be always horizontally aligned or at a same angle with respect to a horizontal plane without additional adjustment in the movement of the camera relative to the vertical direction. The operation is simple. The color of the foot cover 8 and the color of the connecting rod 6 are contrasting colors. In some implementations, the color of the connecting rod 6 is set to black and the color of the foot cover 8 is set to yellow. The sharp contrast helps recognize the points where the tripod touches the floor in the image. The height of the tripod can be accurately calculated by measuring the distance between the points where the tripod touches the floor in the image.

Figure 2:
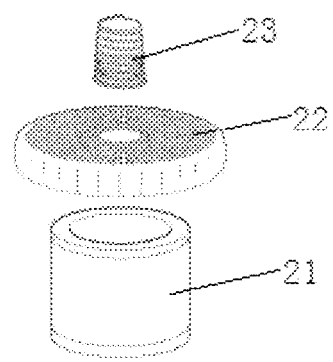
FIG. 2 is a schematic structural diagram illustrating a mounting support according to an embodiment of the present disclosure.

Referring to FIG. 2, in the tripod for 3D modeling according to the embodiment of the present disclosure, the mounting support 2 includes an install cylinder 21, a round base 22, and an install screw 23, the round base 22 is attached to the top of the telescopic rod 1 through the install cylinder 21, and the install screw 23 is set at the center of the round base 22. In some implementations, the mounting support is provided with a quick release plate base, the quick release plate base is installed using the install screw, the quick release plate base is provided with a quick release plate for mounting a camera, and the quick release plate is a movable card plate. The movable card plate can be adjusted in width and locked through a locking knob. The panoramic camera is attached to the quick release plate base through the quick release plate.

According to the tripod for 3D modeling and the method for determining camera capture parameters provided in the present disclosure, contrasting colors are used at the bottom of the tripod where it touches the floor, e.g., the connecting rod 6 and the foot cover 8, to help recognize the points where the tripod touches the floor, and the height of the tripod can be accurately calculated by measuring the distance between these points in the image, e.g., by measuring a distance between a foot cover 8 and the bottom of the telescopic rod 1 or by measuring a distance between two foot covers 8; the mobile phone holder is attached to the tripod, and a direction sensor of the mobile phone is used to record the direction during capture, so that the accurate capture direction can be obtained even when the camera does not have a direction sensor; the tripod features a simple structure, easy operation, low costs, and a compact storage which is easy to carry.

The present disclosure further provides a method for determining a camera height by using the above tripod.

In operation (S1), a view directly below a camera is obtained by rendering the panoramic image captured by a panoramic camera as texture inside a 3D globe. In some implementations, the panoramic camera includes two lenses, each capturing a portion of the panoramic image. In some implementations, the image portion captured by a lens of the two lenses are checked to see whether the image portion includes two foot covers 8. In a typical scenario, at least one of the two lenses will capture two foot covers 8. If none of the two lenses captures two foot covers 8, e.g., a foot cover 8 is adjacent to a border line between the two image portions captured by the two lenses, calibration or adjustment of the shooting angle of the panoramic camera may be conducted. For example, the shooting angle of the panoramic camera may be adjusted to ensure that at least one of the two lenses captures two foot covers 8.

In operation (S2), a foot cover is located as an area in the view, and the position of the center point of the foot cover 8 is calculated. There are multiple approaches for locating a foot cover 8, for example, (1) designing the target as a specific color on the foot cover 8, and recognizing the target in the view; (2) designing the target as a special shape or mark on the foot cover 8, such as crosshairs, concentric circles, etc., and locating a corresponding shape in the view; (3) installing an emitter on the foot cover 8 to emit visible/invisible light; (4) using an image segmentation method to recognize the entire floor stand in the image and then finding three legs of the floor stand; (5) like method 2, photographing the target in advance, and then locating the foot cover 8 by using a template matching algorithm. Other approaches to locate a foot cover 8 on an image captured by the panoramic camera is also possible and included in the scope of the disclosure.

In some implementations, in the present disclosure, the color of the foot cover 8 and the color of the connecting rod 6 are contrasting colors. An image is transformed to HSV color space, and then the image is binarized by using the feature of the sharp contrast between the foot cover and the surroundings to recognize the area where the foot cover 8 locates.

In operation (S3), in a case that two foot covers 8 are visible to at least one of the two lenses of the panoramic camera, a distance, e.g., a Euclidean distance, between these two foot covers 8 is calculated. In some implementations, the center points of the two fort covers 8 are used to calculate the distance between the two foot covers 8. Other approaches to calculate the distance between the two foot covers 8 are also possible and included in the scope of the disclosure.

In operation (S4), a height of the panoramic camera is determined based on the distance between the two foot covers 8. The distance between the two foot covers 8 is related to the height of the floor stand 10 and thus the height of the camera, but it is not a simple linear relationship. In some implementations, to determine a relationship between the distance and the camera height, actual experimental measurements are performed in advance. An example set of measured values is as follows:

| Camera height (centimeters) | 148 | 145.5 | 143.5 | 141.5 | 139 |
|---|---|---|---|---|---|
| Distance between foot covers (pixels) | 544.5 | 556.1 | 560.8 | 568.1 | 588.0 |

After multiple data samples measurements have been obtained, a mapping/correspondence relationship between the distance values between two foot covers 8 and various heights of the panoramic camera is obtained.

In operation (S5), in some implementations, a function between the distance between two foot covers 8 and the height of the camera is obtained, e.g., based on the measured data samples, so that a height of the panoramic camera can be obtained based on the measured distance between two foot covers 8 and the function. For example, a cubic spline interpolation may be conducted based on the data samples obtained in operation S4 to obtain the function.

In operation (S6), for a newly captured image, the height of the camera lens is calculated using the cubic spline function based on the determined distance between the two foot covers 8.

The present disclosure further provides a method for calculating the direction of capturing an image by using the above tripod. Most panoramic cameras cannot provide the direction of the camera lens, bringing certain difficulties to subsequent applications. In the present disclosure, a solution is provided by adding a mobile phone stand to the tripod, which is not rotatable relative to the tripod and is thus not rotatable with respect to the lenses of the panoramic camera. An example process of the method is as follows:

In operation (S7), the mobile phone and the panoramic camera are separately attached onto the tripod, which ensures that an angle of directions between the two remains unchanged. The mobile phone contains a sensor suite that includes one or more sensors such a 3-axis accelerometer, a 3-axis gyroscope, a positioning sensor, a compression sensor, a compass sensor, and other sensors.

In operation (S8), a heading direction of the mobile phone is determined. In some implementations, the heading direction of the mobile phone is the direction of the mobile phone used by the compass sensor of the mobile phone to determine a direction of the mobile phone with the true north. In some implementations, the heading direction of the mobile phone corresponds to a direction of the camera lens of the mobile phone. As such, in some implementations, the position of the mobile phone is determined on operation S8. That is, the mobile phone is determined in a panoramic image captured by the panoramic camera. The heading direction or the camera lens direction of the mobile phone can be used to calculate an angle theta between the directions of the mobile phone and the panoramic camera.

In operation (S9), when capturing another image by the camera, with the help of a sensor, e.g., the 3-axis gyroscope, of the mobile phone, an angle phi of the mobile phone's rotation from its position of the previous camera capture is obtained. Given that the angle between the mobile phone and the camera remains unchanged across the two captures, the angle between the directions of the two camera captures must also be phi. As a result, a relative angle of rotation between subsequent panoramic image captures can be obtained.

In operation (S10), an angle alpha between the direction of the mobile phone and the true north is obtained, with the help of a compass sensor of the mobile phone. Together with the angle theta between the directions of the mobile phone and the panoramic camera, the angle between the camera lens of the panoramic camera and the true north can be calculated.

Although the present disclosure has been disclosed above based on preferred embodiments, the present disclosure is not limited thereto. Any person skilled in the art can make some modifications and improvements without departing from the spirit and scope of the present disclosure. Therefore, the protection scope of the present disclosure shall be defined by the claims.

What is claimed is:

1. A method, comprising:
 mounting a panoramic camera on a tripod, the tripod including a rod and a floor stand, the floor stand including three floor stand brackets that are evenly set around the rod, each floor stand bracket including a foot cover;

obtaining a first image portion of a downward looking view from the panoramic camera from a panoramic image captured by the panoramic camera;

locating two foot covers in the first image portion;

determining a first distance between the two foot covers contained in the first image portion; and determining a first height of the panoramic camera based on the first distance between the two foot covers in the first image portion.

2. The method according to claim 1, wherein the determining the first distance between the two foot covers includes calculating a Euclidean distance between the two foot covers contained in the first image portion.

3. The method according to claim 1, wherein the determining the first distance between the two foot covers includes:

determining a center point of each of the two foot covers; and determining a distance between the two center points as the first distance between the two foot covers.

4. The method according to claim 1, wherein the panoramic camera includes two or more lenses, and the locating two foot covers in the first image portion includes locating two foot covers in an image portion of the panoramic image captured by a single lens of the two or more lenses of the panoramic camera.

5. The method according to claim 4, comprising:

in response to none of the two or more lenses capturing two foot covers in its image portion of the panoramic image, adjusting a shooting angle of the panoramic camera.

6. The method according to claim 1, comprising:

obtaining a plurality of data samples, each data sample including a first value of a camera height and a second value of a distance between two foot covers of the floor stand that corresponds to the first value of the camera height; and performing spline interpolation based on the plurality of data samples to fit a function between the camera height and the distance between two foot covers, wherein the determining the first height of the panoramic camera based on the first distance between the two foot covers in the first image portion includes determining the first height of the panoramic camera based on the first distance between the two foot covers in the first image portion using the function.

7. The method according to claim 1, further comprising:

attaching a mobile phone, separately from the panoramic camera, on the tripod, the tripod including a mobile phone holder for attaching the mobile phone and a mounting support for mounting the panoramic camera, the mounting support and the mobile phone holder configured to enable an angle between the mobile phone and the panoramic camera remain unchanged, the mobile phone including a sensor suite;

capturing a first panoramic image with a first shooting position of the panoramic camera and a second panoramic image with a second shooting position of the panoramic camera; and determining a first angle between the first shooting position and the second shooting position based on a reading of the sensor suite of the mobile phone.

8. The method according to claim 7, comprising:

determining a heading direction of the mobile phone based on the first panoramic image;

determining a second angle between the heading direction of the mobile phone and the panoramic camera;

determining a third angle between the heading direction of the mobile phone and the true north based on a compass sensor of the sensor suite; and determining a fourth angle between the panoramic camera and the true north based on the third angle and the second angle.

9. The method according to claim 8, wherein the determining the heading direction of the mobile phone based on the first panoramic image includes identifying the mobile phone on the first panoramic image.

10. The method of claim 1, wherein:

the tripod includes a mounting support;

the rod is a telescopic rod;

the telescopic rod includes multiple sections of nested hollow round rods, which can be extended and locked;

the mounting support is set on a top of the telescopic rod and configured to mount the panoramic camera;

the floor stand is set at a bottom of the telescopic rod; and the telescopic rod is vertically set on a plane through the floor stand, the three floor stand brackets evenly set around the telescopic rod.

11. The method according to claim 10, wherein a bottom end of an inner nested round rod of the telescopic rod is provided with a locking pin, and a top end of an outer nested round rod is provided with a locking hole.

12. The method according to claim 10, wherein the mounting support includes an install cylinder, a round base, and an install screw, the round base is attached to the top of the telescopic rod with the install cylinder, and the install screw is set at a center of the round base.

13. The method according to claim 12, wherein the mounting support is provided with a quick release plate base, the quick release plate base is installed using the install screw, the quick release plate base is provided with a quick release plate for mounting the camera, and the quick release plate is a movable card plate, the movable card plate adjustable in width and configured to be locked through a locking knob.

14. The method according to claim 10, wherein the tripod includes a mobile phone holder fastened to the telescopic rod, and a width of the mobile phone holder is adjustable.

15. The method according to claim 10, wherein the floor stand includes three sets of connecting rods and support rods and the telescopic rod includes a sliding ring, a first end of a support rod being pin-connected to a middle of a respective connecting rod, a second end of the support rod being pin-connected to the bottom of the telescopic rod through a fixed ring, a first end of the connecting rod being pin-connected to the sliding ring, and a second end of the connecting rod including a foot cover.

16. The method according to claim 15, wherein the sliding ring includes a bushing at the inner side, the sliding ring configured to move on the telescopic rod and be locked through a locking screw onto the sliding ring.

17. The method according to claim 15, wherein a color of the foot cover and a color of the connecting rod are contrasting colors.

18. A method, comprising:

mounting a panoramic camera on a tripod, the tripod including a rod and a floor stand, the floor stand including three floor stand brackets that are evenly set around the rod, each floor stand bracket including a foot cover;

attaching a mobile phone, separately from the panoramic camera, on the tripod, the tripod including a mobile phone holder for attaching the mobile phone and a mounting support for mounting the panoramic camera, the mounting support and the mobile phone holder configured to enable an angle between the mobile phone and the panoramic camera remain unchanged, the mobile phone including a sensor suite;

capturing a first panoramic image with a first shooting position of the panoramic camera and a second panoramic image with a second shooting position of the panoramic camera; and determining a first angle between the first shooting position and the second shooting position based on a reading of the sensor suite of the mobile phone determining a heading direction of the mobile phone based on the first panoramic image, the determining the heading direction of the mobile phone including identifying the mobile phone on the first panoramic image;

determining a second angle between the heading direction of the mobile phone and the panoramic camera;

determining a third angle between the heading direction of the mobile phone and a calibration direction based on a compass sensor of the sensor suite; and determining a fourth angle between the panoramic camera and the calibration direction based on the third angle and the second angle.

\* \* \* \* \*